INVENTOR.
BY NICHOLAS D. DIAMANTIDES
Hudson, Coughton,
Williams, David & Hoffmann.
ATTORNEYS United States Patent Office 2,702,363
Patented Feb. 15, 1955

2,702,363

LOAD-LOOP COMPENSATED VOLTAGE REGULATOR

Nicholas D. Diamantides, Cleveland, Ohio, assignor to The Leece-Neville Company, Cleveland, Ohio, a corporation of Ohio Application June 19, 1951, Serial No. 232,348

4 Claims. (Cl. 322—25)

This invention relates to the control of electrical generating systems of the kind used on vehicles for battery charging and auxiliary purposes and which embody a variable speed variable load generator. More particularly, the invention relates to an improved load compensated voltage regulating means for generating systems of this type.

An object of the present invention is to provide improved control means for an electric generating system in which conductor means of the load circuit is disposed in such relation to a voltage regulator that the magnetic field of the conductor means is effective on and modifies the operation of the voltage regulator to produce a load compensated functioning thereof.

Another object is to provide an improved generating system embodying such a load compensated voltage regulator in which the generator is an alternator, preferably a three-phase alternator connected with an external direct current load circuit through a power rectifier, and in which the conductor means producing the load compensating effect on the voltage regulator is a portion of such direct current load circuit.

A further object is to provide an improved regulating unit for an electric generating system, comprising voltage and current regulators of the relay type and in which a conductor loop of the series magnet coil of the current regulator extends into such proximity to the voltage regulator as to produce a load compensating action thereon.

Still another object is to provide an improved generator system regulating unit of the character mentioned in which the load compensating loop of the series magnet coil of the current regulator is disposed adjacent the armature end of the core of the voltage regulator.

As an additional object this invention provides an improved generator system regulating unit of the character mentioned in which a loop of the series magnet coil of the current regulator produces a load compensating action on the voltage regulator and in which the voltage regulator is a double contact type of electromagnetic regulator.

This invention can be further briefly summarized as consisting in certain novel combinations and arrangements of parts hereinafter described in detail and particularly set out in the claims hereof.

In the accompanying sheets of drawings,

Fig. 3 is a partial vertical section taken through the core of the voltage regulator and the load compensating loop in proximity thereto, the view being taken substantially as indicated by section line 3—3 of Fig. 1.

Figure 1:
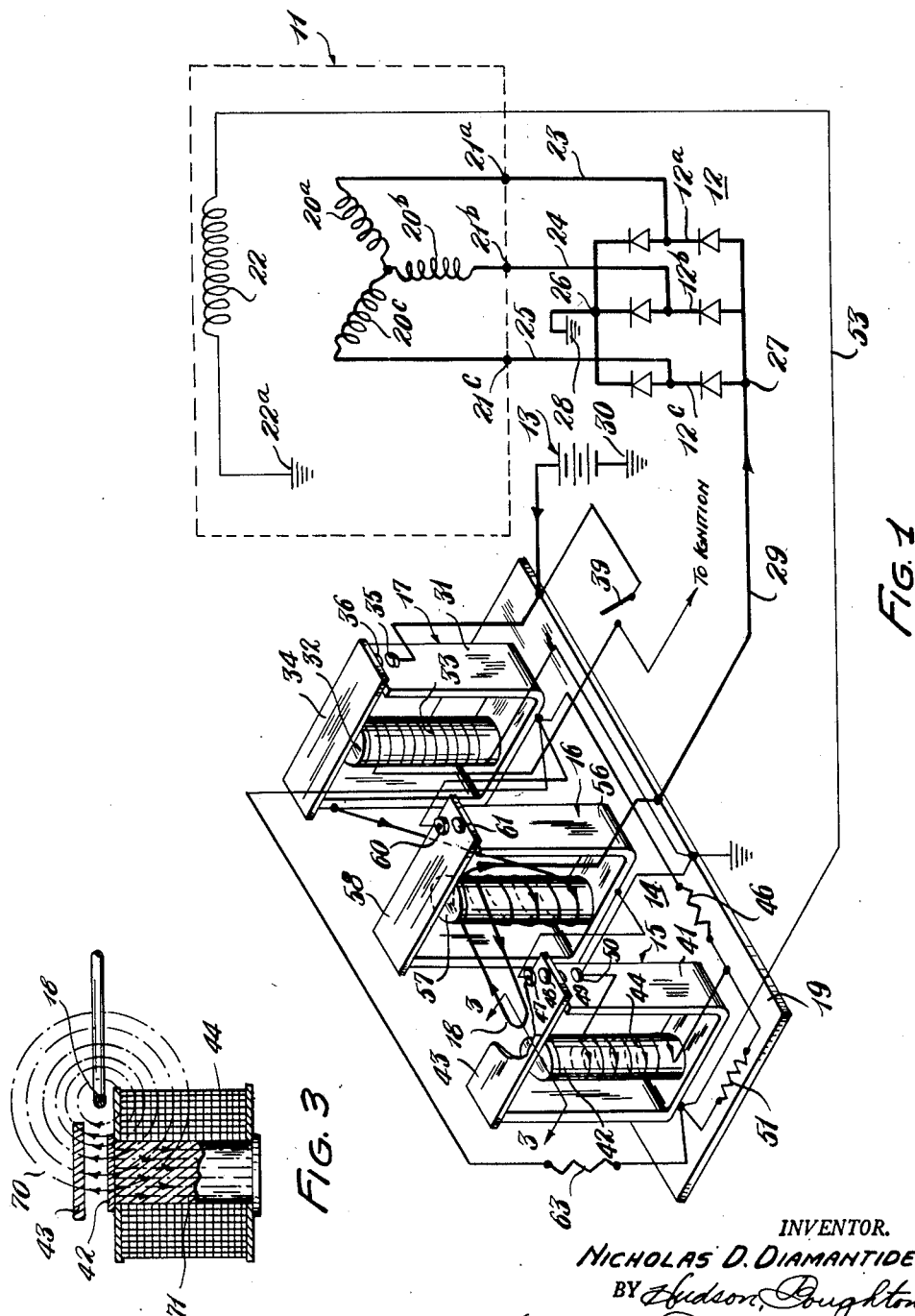
Fig. 1 is a diagrammatic view, partly in perspective, showing a generating system embodying the improved control means of the present invention.
Figure 2:
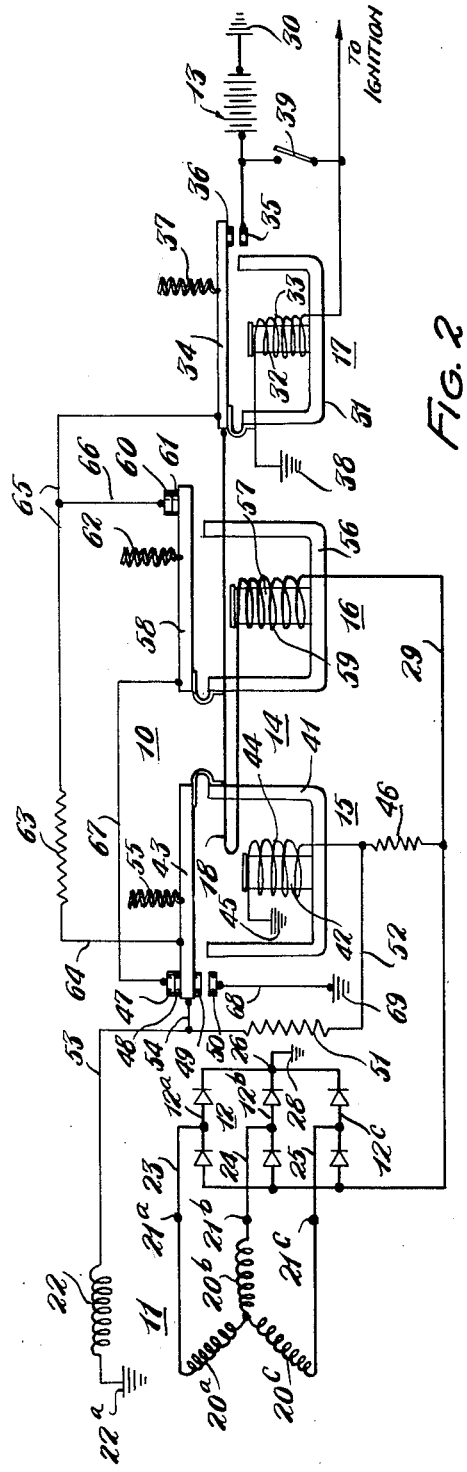
Fig. 2 is a wiring diagram further illustrating the electrical system of Fig. 1.

The generating system 10 illustrated in Figs. 1 and 2 comprises, in general, an alternator 11 adapted to deliver current through a power rectifier 12 to a direct current external load which is here represented by the storage battery 13 to be charged, and a control unit 14 embodying a plurality of control devices consisting of a voltage regulator 15, a current regulator or load limiter 16 and a load relay 17. As an important feature of the present invention, the system 10 also includes a load compensating conductor portion or loop 18 which will be further described hereinafter. The voltage and current regulators 15 and 16 are disposed in adjacent relation to each other and for this purpose can be mounted on a suitable rigid base 19 which is here shown as being formed by a flat rectangular plate. The load relay 17 can also be mounted on the base 19, as shown in Fig. 1.

The alternator 11 is here shown as being a three-phase alternator having star connected inductor windings 20a, 20b and 20c which are connected respectively with the terminals 21a, 21b and 21c, and a field winding 22. One end of the field winding is grounded as indicated at 22a and the other portion of the field circuit is described hereinafter. As indicated above, the generating system 10 may be a vehicle electrical system for battery charging and auxiliary purposes, and the alternator 11 thereof is adapted to be driven at variable speeds by the vehicle engine.

The rectifier 12 is a three-phase full wave bridge type power rectifier which may be of the dry plate construction and comprises circuit arms 12a, 12b and 12c with which the respective alternator terminals 21a, 21b and 21c are connected by the conductors 23, 24 and 25. The rectifier also has a pair of direct current load terminals 26 and 27, of which the terminal 26 is connected with a common return conductor or ground, as indicated at 28. The load terminal 27 of the rectifier is connected with one terminal of the storage battery 13 through the control unit 14 by a load conductor 29. The other terminal of the storage battery is also connected with ground, as indicated at 30.

The load relay 17 may be a conventional form of magnetic switch for connecting the load conductor 29 with the storage battery 13 and disconnecting the same therefrom. This relay is here shown as comprising a frame 31 including a core 32 carrying a magnet winding 33, and an armature 34 disposed in cooperating relation to such frame and core. The load relay also includes stationary and movable switch contacts 35 and 36, the latter of which is carried by the armature 34 and is normally urged toward an open position by a tension spring 37 acting on the armature. One end of the magnet coil 33 is connected with ground, as indicated at 38, and the other end is adapted to be connected with the storage battery 13 through the load conductor 29 and the ignition switch 39.

The voltage regulator 15 comprises a magnet frame 41 including a core 42 and a vibratory armature 43 disposed in cooperating relation to the upper end of such core. The voltage regulator is provided with a single magnet coil 44 having one end thereof connected with ground, as indicated at 45, and its other end connected with the load conductor 29 through a ballast resistor 46. This voltage regulator also comprises an upper pair of switch contacts 47 and 48 and a lower pair of switch contacts 49 and 50. The contacts 47 and 50 are stationary contacts and the contacts 48 and 49 are movable contacts which are carried by and electrically connected with the armature 43. A tension spring 55 acting on the armature 43 urges the movable contact 48 toward a closed position in engagement with the stationary contact 47.

The voltage regulator 15 also includes a regulating resistance 51 which cooperates with the magnet coil 44 in producing an effective vibratory action of the armature 43. One end of the regulating resistance 51 is connected with the energizing circuit for the magnet coil 44, at a point between this coil and the ballast resistor 46, by the conductor 52. The other end of the regulating resistance 51 is connected with the field winding 22 by a conductor 53 and is also connected with the armature 43 by the conductor 54.

The current regulator or load limiter 16 comprises a magnet frame 56 which includes a core 57 and a vibratory armature 58 disposed in cooperating relation to the upper end of such core. The current regulator also includes a magnet coil 59 which is a series coil in the external direct current load circuit and is disposed around the core 57. This current regulator also includes a pair of stationary and movable switch contacts 60 and 61, the latter of which is carried by the armature 58 and is normally urged toward a closed position by a tension spring 62 acting on the armature.

The control unit 14 comprising the voltage and current regulators 15 and 16 also includes a field resistance or so-called point resistor 63 of a suitable value for controlling the excitation of the field winding 22 and which resistor has one end thereof connected with the armature 43 of the voltage regulator by the conductor 64 and its other end connected with the armature 34 of the load relay 17 by the conductor 65. Such other end of the point resistor 63 is also connected with the stationary contact 60 of the current regulator 16 by the conductor 66. The circuit connections for the voltage and current regulators also include a conductor 67 which connects the armature 58 of the current regulator with the stationary contact 47 of the voltage regulator and a conductor 68 which connects the stationary contact 50 of the voltage regulator with ground, as indicated at 69.

Reverting now to the important feature of the above-mentioned load compensating conductor portion 18, it should be explained that this conductor portion is a loop or conductor portion of the external direct current load circuit 29 and extends in such proximity to the voltage regulator 15 that the magnetic field produced by this conductor portion as the result of the load current flowing therethrough will be effective on the voltage regulator and modify the functioning thereof in accordance with the value of the load current. In the construction here shown for the control unit 14, the load compensating loop 18 is disposed adjacent the upper or armature end of the core 42 of the voltage regulator 15 and is formed by an extension of a turn of the series magnet coil 59 of the current regulator 16. As here shown the loop 18 is located below the armature 43 and approaches the upper end of the core 42 from one side thereof such that the lines of force 70 of the magnetic field developed around the end portion or apex of the loop will have a clockwise direction around the conductor, as shown in Fig. 3, which is in opposition to the direction of the lines of force 71 developed in the core 42 of the voltage regulator 15 by the magnet coil 44 thereof.

In the operation of the improved generating system 10, the alternator 11, when driven by the vehicle engine, will deliver current through the rectifier 12 to the external direct current load circuit which includes the storage battery 13. The closing of the ignition switch 39 will result in energization of the magnet coil 33 of the load relay 17 and cause closing of the load contacts 35 and 36 to connect the load circuit with the battery. When the operating condition of the alternator 11 is such that the contacts 60 and 61 of the current regulator 16 and the upper pair of contacts 47 and 48 of the voltage regulator 15 are closed, the point resistor 63 will be short-circuited out of the circuit of the field winding 22.

At this time the energizing circuit for the voltage coil 44 of the voltage regulator 15 will be such that the regulating resistance 51 is in parallel with the ballast resistor 46 and will supply additional energizing current to the magnet coil, thereby tending to strengthen the pull of the magnet on the armature 43 and accelerate the opening of the upper pair of contacts 47 and 48. The parallel portion of this energizing circuit for the magnet coil 44 can be traced from the armature 34 of the load relay, through the conductor 65, through the point resistor 63, the conductor 64, then through armature 43 of the voltage regulator, conductor 54, regulating resistance 51, and then through conductor 52 to the terminal load of the magnet coil 44.

The opening of either the contacts 60 and 61 of the current regulator or the upper pair of contacts 47 and 48 of the voltage regulator will alter the field circuit by inserting the point resistor 63 therein in series with the field winding 22 to reduce the field excitation of the alternator. The opening of the contacts 47 and 48 of the voltage regulator 15 also changes the energizing circuit for the magnet coil 44 by placing the regulating resistance 51 in shunt relation to this coil so as to decrease the energization thereof and the magnetic pull on the armature 43 to thereby accelerate the reclosing of the contacts 47 and 48. When the speed and load conditions of the alternator 11 are such as to cause operation of the voltage regulator 15 on the lower pair of contacts 49 and 50 thereof, the closing of these contacts will substantially short-circuit the field winding 22 to cause deenergization thereof and the opening of these contacts will reestablish the field circuit.

During the operation of the generating system 10, as above described, the load compensating loop 18 is effective on the voltage regulator 15 during all of the time that load current is flowing through this loop. As the ampere value of the load current changes, the effectiveness of the loop in modifying the action of the voltage regulator will vary correspondingly such that a very satisfactory load compensating action on the voltage regulator will be continuously obtained. The practical and successful functioning of the load compensating loop 18 is further shown by the following tabulation which is given as one example of the actual performance of a regulating unit corresponding with the regulating unit 14.

| Load Current in Amperes | Terminal Voltage of Generator— | |
| --- | --- | --- |
| | at 2,000 R. P. M. | at 2,500 R. P. M. |
| 5 | 13.75 | 13.75 |
| 10 | 13.75 | 13.75 |
| 20 | 14.00 | 13.72 |
| 30 | 13.80 | 13.82 |
| 40 | 13.78 | 13.78 |
| 50 | 13.75 | 13.75 |
| 60 | 13.75 | 13.72 |
| 70 | 13.72 | 13.70 |
| 80 | 13.70 | 13.70 |
| 90 | 13.70 | 13.68 |
| 100 | 13.67 | 13.67 |

In the above example, the ampere values listed represent the load current flowing through the load compensating loop 18 and the voltage values of the two right hand columns show by comparison with each other that notwithstanding the wide variation in generator load and speed, the voltage regulator maintained the terminal voltage remarkably steady.

Figure 4:
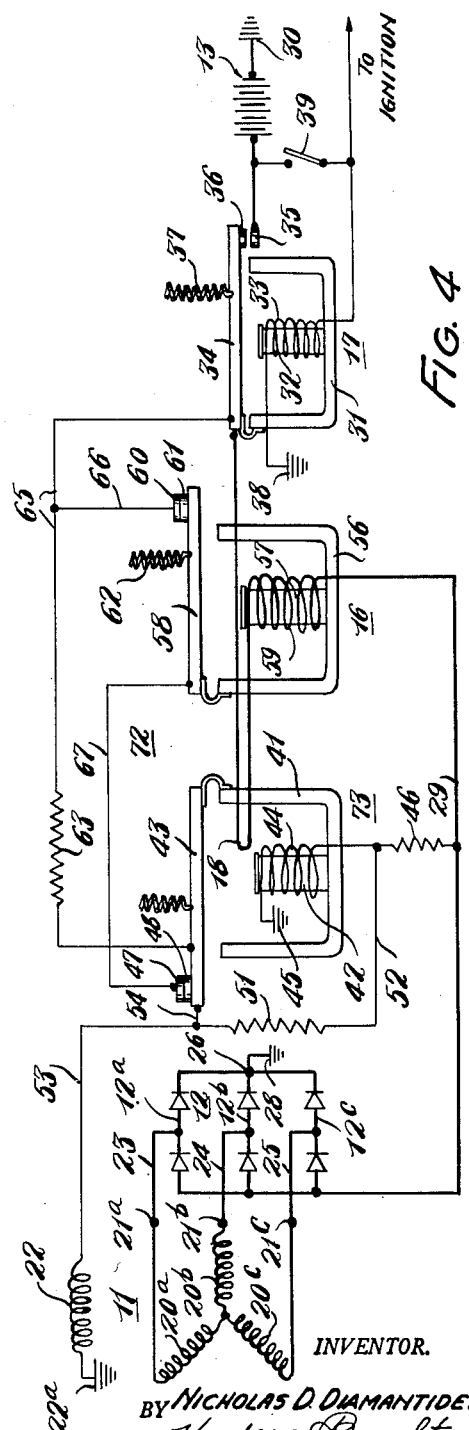
Fig. 4 is another wiring diagram similar to Fig. 2 but showing a modified form of generating system in which the voltage regulator is of the single contact type.

Fig. 4 of the drawings shows another generating system 72 which is generally similar to the system 10 of Fig. 2 and functions in a similar manner. The modified generating system of Fig. 4 differs from the generating system of Fig. 2 in that the voltage regulator 73 is a single contact regulator in which the lower pair of contacts has been omitted, as well as the conductor 68 and the ground connection 69. In all other respects the generating system 72 corresponds with the system of Fig. 2 and functions in a similar manner and the corresponding parts of the two systems have been designated by the same reference characters.

From the foregoing detailed description and the accompanying drawings it will now be readily understood that this invention provides improved regulating means for a generating system, and particularly for a vehicle electrical system, in which a conductor portion of the load circuit is disposed in such proximity to the voltage regulator as to produce a load compensating effect thereon. Additionally, it will be seen that this invention provides for the embodiment of this load compensating feature in a generator control unit comprising voltage and current regulating devices of the relay type and also provides for the embodiment of this load compensating feature in a generating system wherein the generator is an alternator, such as a three-phase alternator, and delivers current to the external load circuit through a power rectifier.

Although the improved generating system and novel regulating means of the present invention have been illustrated and described herein to a somewhat detailed extent it will be understood, of course, that the invention is not to be regarded as being limited correspondingly in scope but includes all changes and modifications coming within the terms of the claims hereof.

Having thus described my invention, I claim:

1. In electrical apparatus of the character described; a generator having terminals and a field winding; a field winding circuit including said field winding; an external load circuit connected with said terminals; a voltage regulator comprising a magnet core, an energizing coil on said core and connected with said terminals so as to be responsive to generator voltage, an armature adjacent one end of said core and responsive to the magnetization thereof and switch contacts adapted to be actuated by said armature; a current regulator adjacent said voltage regulator and comprising a magnet core, an energizing coil on the last-mentioned magnet core and located in series relation in said load circuit, an armature adjacent said last-mentioned magnet core and responsive to the magnetization thereof and switch contacts adapted to be actuated by the last-mentioned armature; a field resistance in said field winding circuit; a ballast resistance in series circuit with the energizing coil of said voltage regulator; a regulating resistance; circuit connections connecting said field winding and said resistances with the switch contacts of said voltage and current regulators such that when the voltage regulator contacts are closed during a closed condition of the current regulator contacts said field resistance is short-circuited out of said field winding circuit and said regulating resistance is electrically connected in circuit with the energizing coil of the voltage regulator in shunt relation to said ballast resistance; and a conductor loop projecting laterally from the energizing coil of said current regulator and approaching the armature end of the voltage regulator core from the side thereof and at an elevation below the voltage regulator armature such that the magnetic field of said loop is effective on and modifies the action of the voltage regulator.

2. In generator control apparatus; an alternator having terminals and a field winding; a field winding circuit including said field winding; a rectifier connected with the generator terminals and having direct current terminals; a direct current load circuit connected with said direct current terminals; a voltage regulator comprising a magnet core, an energizing coil on said core and connected with said direct current terminals so as to be responsive to generator voltage, an armature adjacent one end of said core and responsive to the magnetization thereof and switch contacts adapted to be actuated by said armature; a current regulator adjacent said voltage regulator and comprising a magnet core, an energizing coil on the last-mentioned magnet core and located in series relation in said load circuit, an armature adjacent said last-mentioned magnet core and responsive to the magnetization thereof and switch contacts adapted to be actuated by the last-mentioned armature; a field resistance in said field winding circuit; a ballast resistance in series circuit with the energizing coil of said voltage regulator; a regulating resistance; circuit connections connecting said field winding and said resistances with the switch contacts of said voltage and current regulators such that when the voltage regulator contacts are closed during a closed condition of the current regulator contacts said field resistance is short-circuited out of said field winding circuit and said regulating resistance is electrically connected in circuit with the energizing coil of the voltage regulator in shunt relation to said ballast resistance and such that opening of the voltage regulator contacts reinserts said field resistance in said field winding circuit and causes said regulating resistance to be electrically connected in shunt relation to the energizing coil of the voltage regulator; and a load conductor loop projecting from the energizing coil of said current regulator and extending adjacent the armature end of the voltage regulator core such that the magnetic field of said loop is in opposition to the magnetic flux of said voltage regulator core.

3. In electrical apparatus of the character described, a generator having terminals and a field winding, a field winding circuit, an external load circuit connected with said terminals, a voltage regulator comprising a magnetic switch device having a magnet core carrying an energizing coil connected with said terminals and responsive to generator voltage and two pairs of switch contacts controlling the energization of said coil and said field winding and actuated by armature means responsive to the magnetization of said core, a second electromagnetic switch device disposed adjacent said voltage regulator and comprising a magnet core carrying an energizing winding connected in series in said load circuit, a field resistance in said field winding circuit, a ballast resistance in series circuit with said coil, a regulating resistance, circuit connections connecting said field winding and said resistances with said switch contacts such that when one pair of said contacts is closed said field resistance is short-circuited out of said field winding circuit and said regulating resistance is electrically connected in circuit with said coil in shunt relation to said ballast resistance and when the other pair of said contacts is closed said field winding is substantially short-circuited therethrough and said regulating resistance is electrically connected in circuit with said energizing coil in shunt relation to the latter, and a conductor loop projecting from the energizing winding of said second switch device and extending into adjacent relation to the armature end of the core of said voltage regulator such that the magnetic field of said conductor loop is effective on and modifies the action of said voltage regulator.

4. In electrical apparatus of the character described; a generator having terminals and a field winding; and external load circuit connected with said terminals; a voltage regulator comprising a magnet core, an energizing coil on said core and connected with said terminals so as to be responsive to generator voltage, an armature adjacent one end of said core and responsive to the magnetization thereof and two pairs of switch contacts adapted to be actuated by said armature; a current regulator adjacent said voltage regulator and comprising a magnet core, an energizing coil on the last-mentioned magnet core and located in series relation in said load circuit; an armature adjacent said last-mentioned magnet core and responsive to the energization thereof and switch contacts adapted to be actuated by the last-mentioned armature; a field resistance in said field winding circuit; a ballast resistance in series circuit with the energizing coil of said voltage regulator; a regulating resistance; circuit connections connecting said field winding and said resistances with the switch contacts of said voltage and current regulators such that when one pair of the voltage regulator contacts is closed during a closed condition of the current regulator contacts said field resistance is short-circuited out of said field winding circuit and said regulating resistance is electrically connected in circuit with the energizing coil of the voltage regulator in shunt relation to said ballast resistance and when the other pair of the voltage regulator contacts is closed said field winding is substantially short-circuited therethrough and said regulating resistance is electrically connected in circuit with the energizing coil of the voltage regulator in shunt relation to the latter coil; and a conductor loop projecting from the energizing coil of the current regulator and extending into adjacent relation to the armature end of the core of said voltage regulator such that the magnetic field of said conductor loop is effective on and modifies the action of said voltage regulator.

References Cited in the file of this patent

UNITED STATES PATENTS

| | | |
|---|---|---|
| 1,724,197 | Hartzell | Aug. 13, 1929 |
| 2,558,643 | Claytor | June 26, 1951 |